July 14, 1970   G. M. CONDIE   3,520,192
PRESSURE GAUGE CASING WITH TELESCOPING ELEMENTS
Filed Nov. 25, 1968

INVENTOR.
GRAHAM M. CONDIE
BY
H. Henry Stoltenberg
ATTORNEY

United States Patent Office 3,520,192
Patented July 14, 1970

3,520,192
PRESSURE GAUGE CASING WITH TELESCOPING ELEMENTS
Graham M. Condie, Marshalltown, Iowa, assignor to Marshalltown Manufacturing, Inc., Marshalltown, Iowa
Filed Nov. 25, 1968, Ser. No. 778,606
Int. Cl. G01l 7/04
U.S. Cl. 73—416                                4 Claims

ABSTRACT OF THE DISCLOSURE

A separable transparent instrument casing of two telescoping cup-shaped elements held together relative to each other by an annular detent, and provided with rounded cutouts in their cup rims which embrace an undercut cylindrical portion of the main square stem of a pressure gauge element, one of the elements being affixed to the gauge stem whereby a transparent casing for the pressure gauge element is provided which is separable should a rupture occur in the pressure system to prevent explosive conditions.

---

Figure 1:
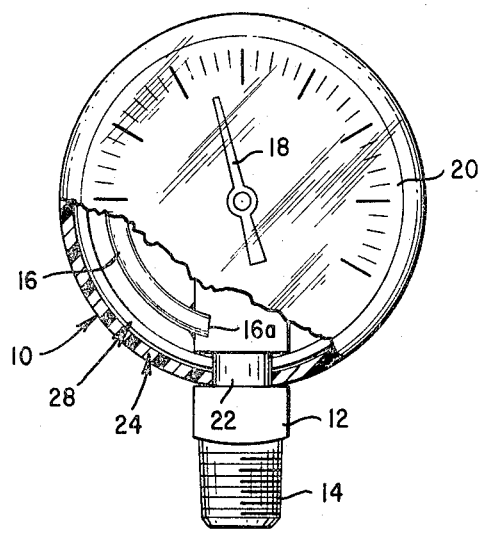

This invention relates to pressure gauges, more particularly to separable casings for pressure gauges which allows "breathing" and which will disengage to release pressure buildups in the event there is a rupture in the pressure system within the casing to thereby obviate the possibility of an explosion to endanger persons in the vicinity.

It is therefore a principal object of this invention to provide a separable casing for pressure gauges fabricated from two telescoping cup-shaped elements, one of which is transparent to enable an operator to read the pressure readings.

It is a further object of this invention to provide a separable casing for pressure gauges which will disengage when pressure buildups arise from rupture of the elements of the pressure system.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification, wherein like reference characters designate corresponding parts in the several views.

Figure 2:
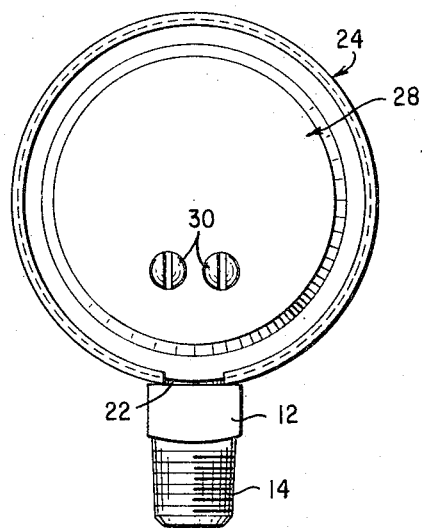
Figure 3:
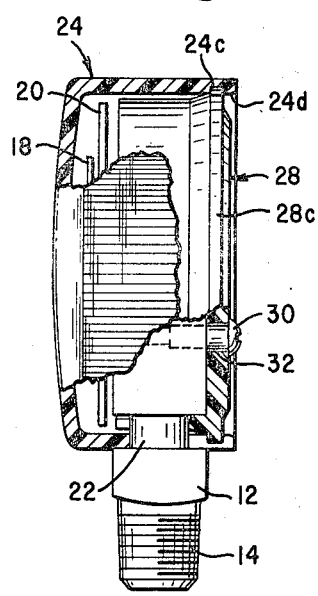
Figures 4, 5:
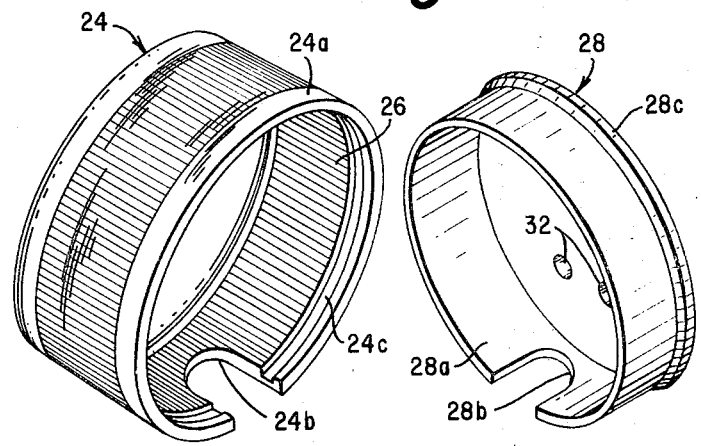
Figure 7:
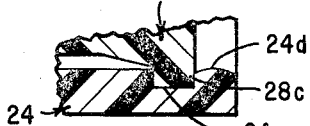
Figure 6:
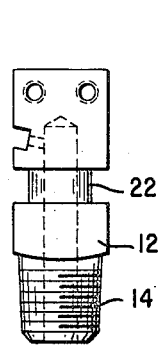

FIG. 1 is a front elevational view partly in section of a gauge to which the invention has been applied;
FIG. 2 is a rear elevational view;
FIG. 3 is a side elevational view partly in section;
FIG. 4 is an isometric view of the front casing element;
FIG. 5 is an isometric view of the rear casing element;
FIG. 6 is an elevational view of the gauge stem showing an undercut; and
FIG. 7 is a cross-sectional view of a detent locking the front and rear casing elements together.

Referring to the drawings, particularly to FIG. 1, a pressure gauge 10 is shown, having a stem 12, preferably of square conformation which is provided at its lower end with a pipe thread 14 by which the gauge is inserted into a pressure system whose pressure is to be measured. A Bourdon tube 16 is affixed to the stem 12 in a conventional manner, being adapted to drive an indicating pointer 18, which cooperates with an indicia bearing card 20 in a well-known manner. The details of construction of the pressure measuring device may vary widely to suit special conditions and will not be described further.

The square stem 12 of the gauge is provided with an undercut to provide a cylindrical entry section 22, which is positioned between the threaded section 14 on the lower end, and the point 16a at which the Bourdon tube is anchored to the stem 12. The undercut as shown has the advantage of being concentric with the threaded section 14 so that both forming operations can be performed simultaneously with the result that costs can be maintained at a minimum. The cylindrical section 22 provides a symmetrical surface to cooperate with casing elements to provide a closure which however allows "breathing" so that pressures may balance.

Referring now to FIGS. 4 and 5, two cup-shaped casing elements are shown which are dimensional to telescope together as shown best in FIG. 3. The outer cup-shaped casing element 24 is fabricated from transparent plastic material such as a polycarbonate, to provide a transparent front face through which the measuring relation between the movable pointer 18 and the indicia calibrations on the card 20 can be ascertained by an operator. The annular flange 24a of the element 24 is provided with internal striations 26 which improve the visual effect of the instrument as a whole and yet is sufficiently translucent to allow light to illuminate the indicia card 20 to improve the readability of the gauge by the operator. The second inner cup-shaped casing element 28 positioned at the rear of the casing is preferably made of opaque plastic material, preferably polycarbonate, and is adapted to be affixed by screws 30 threaded into stem 12 passing through apertures 32 in the base of the casing element 28 as best seen in FIGS. 2, 3 and 5. The annular flange 28a of the casing element on its bottom side is provided with a semi-circular indentation or cutout 28b which closely engages the cylindrical section 22 of the stem 12 when the element is in affixed position on the stem 12 as already described.

With the inner casing element 28 in affixed position on the stem 12, the outer casing element 24 is thrust into telescoped relation therewith, so that a similar semi-circular indentation 24b in the flange of the outer element 24 also engages the cylindrical section 22 to provide a closure for the entry to the casing as a whole as already mentioned. In order to hold the two telescoped casing elements locked together, an annular detent is provided operating between the two elements, consisting of an inner annular groove 24 adjacent the terminus of the annular flange 24a forming the female portion of the detent, into which is fitted a male portion on the inner casing element 28 consisting of an outwardly projecting annular flange 28c, formed as a continuation of the base portion of the inner casing element 28 as best seen in FIGS. 3 and 7. It will be noted that the outer lip 24d of the groove 24c has a slightly large transverse diameter so that its displacement is reduced when the detent portions are engaged into final interlocking position as shown in FIG. 3. The inherent flexibility of the outer casing element 24 aided by the bight 24b, allows the parts to be interlocked as shown.

The interlocking parts of the detent operable between the casing elements 24 and 28, are capable of being disengaged in the event the internal pressure within the casing should suddenly rise due to the rupture of the pressure system within the casing, thereby preventing explosive conditions from arising. The closure for the casing is yet only relatively good so that "breathing" will balance the pressures within and without the casing, so as to compensate the readings of the pressure gauge due to changes in atmospheric conditions or the like.

It is to be understood that the above detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

I claim:

1. In a pressure gauge with an entry stem and a pressure responsive element adapted to create relative movement between an indicating element and a scale member, a pair of telescoping cup-shaped casing elements to enclose the pressure responsive gauge elements, a detent on peripheral portions of the casing elements to hold the two casing elements in telescoped relation, having an operable portion on either casing element adapted to disengage to prevent explosive pressure conditions, a pair of cooperating cutout indentations in each of the cup-shaped casing elements to cooperate with the entry stem of the pressure elements, and a cylindrical portion on the entry stem to extend through the indentations formed by said cutouts to form a closure for the pressure responsive elements which allows breathing of the casing.

2. The gauge defined in claim 1 further characterized by having one casing element made of transparent plastic material to allow the operator to see the gauge readings.

3. The gauge defined in claim 1 further characterized by affixing one of the casing elements to the pressure responsive element.

4. The gauge defined in claim 1 further characterized by having a threaded portion on the entry stem which is concentric with the cylindrical portion.

References Cited

UNITED STATES PATENTS

| | | | |
|---|---|---|---|
| 3,152,480 | 10/1964 | Hoff | 73—431 |
| 3,166,941 | 1/1965 | Waite et al. | 73—431 |
| 3,248,955 | 3/1966 | Templeton | 277—29 X |
| 3,388,600 | 6/1968 | Gorgens et al. | 73—431 |
| 3,432,173 | 3/1969 | Papenguth | 277—29 |
| 3,434,330 | 3/1969 | Ingham et al. | 73—432 |

S. CLEMENT SWISHER, Primary Examiner

D. M. YASICH, Assistant Examiner

U.S. Cl. X.R.

220—44